(12) United States Patent
Ishii et al.

(10) Patent No.: US 10,817,299 B2
(45) Date of Patent: Oct. 27, 2020

(54) HANDLING MULTIPLE CONTROL FLOW INSTRUCTIONS

(71) Applicant: Arm Limited, Cambridge (GB)

(72) Inventors: Yasuo Ishii, Austin, TX (US); Chris Abernathy, Austin, TX (US)

(73) Assignee: Arm Limited, Cambridge (GB)

( * ) Notice: Subject to any disclaimer, the term of this patent is extended or adjusted under 35 U.S.C. 154(b) by 112 days.

(21) Appl. No.: 16/124,264

(22) Filed: Sep. 7, 2018

(65) Prior Publication Data

US 2020/0081715 A1    Mar. 12, 2020

(51) Int. Cl.
*G06F 9/38* (2018.01)
*G06F 9/30* (2018.01)

(52) U.S. Cl.
CPC ........ *G06F 9/3806* (2013.01); *G06F 9/30054* (2013.01); *G06F 9/30058* (2013.01)

(58) Field of Classification Search
None
See application file for complete search history.

(56) References Cited

U.S. PATENT DOCUMENTS

| | | | | |
|---|---|---|---|---|
| 5,287,467 A * | 2/1994 | Blaner | ................. | G06F 9/383 712/235 |
| 5,758,143 A * | 5/1998 | Levitan | ................. | G06F 9/3844 712/240 |
| 5,964,869 A * | 10/1999 | Talcott | ................. | G06F 9/3806 712/236 |
| 6,240,510 B1 * | 5/2001 | Yeh | ................. | G06F 9/30094 712/206 |
| 2001/0047467 A1 * | 11/2001 | Yeh | ................. | G06F 9/3806 712/228 |
| 2004/0003215 A1 * | 1/2004 | Krimer | ................. | G06F 9/3848 712/235 |
| 2004/0049667 A1 * | 3/2004 | McCormick, Jr. | ....... | G06F 9/322 712/233 |
| 2004/0210749 A1 * | 10/2004 | Biles | ................. | G06F 9/3848 712/240 |
| 2005/0216714 A1 * | 9/2005 | Grochowski | ......... | G06F 9/3863 712/240 |
| 2015/0286483 A1 * | 10/2015 | Adiga | ................. | G06F 9/3806 712/239 |

* cited by examiner

*Primary Examiner* — Eric Coleman
(74) *Attorney, Agent, or Firm* — Nixon & Vanderhye P.C.

(57) ABSTRACT

A data processing apparatus is provided that includes a plurality of control flow execution circuits to simultaneously execute a first control flow instruction having a first type and a second control flow instruction having a second type from a plurality of instructions. A control flow prediction update circuit updates at most one of: a prediction of the first control flow instruction based on a result of the first control flow instruction, and a prediction of the second control flow instruction based on a result of the second control flow instruction.

16 Claims, 7 Drawing Sheets

| | Case | 1 | 2 | 3 | 4 | 5 | 6 |
|---|---|---|---|---|---|---|---|
| BX1 (130) | Correctly predicted | ✓ | | ✓ | | | ✓ |
| | Mispredicted | | | | ✓ | ✓ | |
| BX2 (140) | Correctly predicted | | ✓ | | ✓ | ✓ | ✓ |
| | Mispredicted | | | ✓ | | | |
| | Update | None | BX2 | BX2 | BX1 | Older | BX2 |

HANDLING MULTIPLE CONTROL FLOW INSTRUCTIONS

TECHNICAL FIELD

The present disclosure relates to data processing. For instance, it may have relevance to the field of control flow instructions.

DESCRIPTION

In order to achieve Instruction Level Parallelism (ILP) it is often desirable to be able to execute multiple branch instructions at substantially the same time. However, the execution of branch instructions can result in updated being made to branch predictors. Executing two branch instructions at the same time could therefore require two branch predictions to be updated at the same time. This, however, could require the provision of a dedicated second update port to the branch prediction circuitry. This uses up additional space and power.

SUMMARY

Viewed from a first example configuration, there is provided a data processing apparatus comprising: a plurality of control flow execution circuits to simultaneously execute a first control flow instruction having a first type and a second control flow instruction having a second type from a plurality of instructions; and a control flow prediction update circuit to update at most one of: a prediction of the first control flow instruction based on a result of the first control flow instruction, and a prediction of the second control flow instruction based on a result of the second control flow instruction.

Viewed from a second example configuration, there is provided a method comprising: simultaneously executing a first control flow instruction having a first type and a second control flow instruction having a second type from a plurality of instructions; and updating at most one of: a prediction of the first control flow instruction based on a result of the first control flow instruction, and a prediction of the second control flow instruction based on a result of the second control flow instruction.

Viewed from a third example configuration, there is provided a data processing apparatus comprising: means for simultaneously executing a first control flow instruction having a first type and a second control flow instruction having a second type from a plurality of instructions; and means for updating at most one of: a prediction of the first control flow instruction based on a result of the first control flow instruction, and a prediction of the second control flow instruction based on a result of the second control flow instruction.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Before discussing the embodiments with reference to the accompanying figures, the following description of embodiments is provided.

In accordance with one aspect there is provided a data processing apparatus comprising: a plurality of control flow execution circuits to simultaneously execute a first control flow instruction having a first type and a second control flow instruction having a second type from a plurality of instructions; and a control flow prediction update circuit to update at most one of: a prediction of the first control flow instruction based on a result of the first control flow instruction, and a prediction of the second control flow instruction based on a result of the second control flow instruction.

The control flow execution circuit simultaneously executes the first control flow instruction and the second control flow instruction from the plurality of instructions. For example, the first control flow instruction and the second control flow instruction could be executed in a same cycle of the data processing apparatus. In some embodiments, the two instructions are executed simultaneously in such a way that they at least partly overlap with each other. That is that the operation of the control flow execution circuits occurs at substantially the same time (e.g. in the same clock cycle). Control flow instructions cause the sequence of instructions that are executed to be altered. For instance, a control flow instruction may cause one set of instructions to begin execution instead of a different set of instructions. Examples of control flow instructions include branch instructions and return instructions. The control flow prediction update circuit is provided to update at most one of a prediction of the first control flow instruction and a prediction of the second control flow instruction. In other words, only one of the control flow instructions that are simultaneously executed have their prediction updated by the control flow prediction update circuit. Here, the term "prediction" may refer to the confidence with which a prediction is given or the direction in which the branch is predicted to go (e.g. taken or not taken). The prediction could also be a combination of these two factors. As a consequence of the above, it is possible for two control flow instructions to be executed at the same time while not necessitating two update ports to be provided in the prediction circuitry. This is because only one of the two simultaneously executed instructions can be updated at a time. The inventor has discovered that approximately 90% of the time control flow instructions are encountered that are of high confidence and consequently no update is likely to be necessary. Consequently it may be considered to be a rare occurrence where two simultaneously executed control flow instructions both require their predictions to be updated.

In some embodiments, the plurality of control flow execution circuits comprises a high confidence control flow execution circuit to execute the first control flow instruction; and the first type includes control flow instructions whose prediction has a confidence above a predefined level. It will be clear that the above reference to the prediction being compared to the predefined level is made in respect of the confidence associated with that prediction. For instance, in the case of a saturated counter having four states 0-3, low confidence may be reflected by the states '1' and '2' and high confidence may be reflected by the states '0' and '3'. The confidence of the state '0' is above the confidence of the state '1' even though the value '0' is clearly less than the value '1'. Of the control flow execution circuits, one of these is inhibited from executing branches where the confidence associated with the prediction of that branch is not above the predefined level. In this way, one of the two control flow execution circuits is only permitted to execute branch instructions where the predicted outcome is predicted with a high confidence. Consequently, the likelihood of such an instruction being miss-predicted and therefore updated is small. The other of the two control flow execution circuits is permitted to execute branch instructions whose confidence predictions are high or low.

In some embodiments, the plurality of control flow execution circuits are adapted to simultaneously execute a third control flow instruction having the first type from the plurality of instructions; and the plurality of control flow execution circuits comprises a further high confidence control flow execution circuit to execute the third control flow instruction. In such embodiments, the control flow execution circuits include a third control flow execution circuit that is able to execute a third control flow instruction from the plurality of instructions. In a similar way to the situation when there are two control flow execution circuits, the third control flow execution circuit (further high confidence control flow execution circuit) is only able to execute branch instructions where the confidence of the prediction of the branch instruction is above the predefined level. Consequently, only one of the three control flow instructions that are executed simultaneously (e.g. in a same clock cycle) may be expected to have their prediction updated at a time. The skilled person will appreciate that this can be extended to cover any number of control flow execution circuits. As the number of control flow execution circuits is increased, the degree of parallelism is also increased. However, the likelihood with which one of the simultaneously executed control flow instructions requires their prediction to be updated will increase at the same time. Accordingly, since only one such prediction can be updated at a time, it becomes increasingly likely that predictions will remain stale.

In some embodiments, the first type includes direct control flow instructions. In such embodiments, the first type of control flow instruction (which is executed by the high confidence control flow execution circuit) includes those instructions that are direct control flow instructions. A direct control flow instruction is one that directly specifies the target of the control flow instruction. For instance, this would include direct branch instructions where the target of the branch instruction is specified as part of the instruction as opposed to being stored in, for instance, a register. Direct control flow instructions may be considered to be more reliable than indirect control flow instructions since the target of the control flow instruction is effectively "hard coded" into the instruction. Consequently, the behaviour of the instruction is less likely to vary over execution of a program and consequently once a prediction has been made, there are fewer variables that may cause the behaviour of that instruction to alter. Consequently, in these embodiments, all direct control flow instructions are considered to be of the first type. Conversely, in some embodiments, indirect control flow instructions are considered to be of the second type or are considered to be of the first type or second type in dependence on the confidence associated with the prediction.

In some embodiments, the first type includes unconditional control flow instructions. Unconditional control flow instructions include those control flow instructions for which the change in control flow does not depend on other factors. For instance, this may include a branch instruction but might exclude a conditional branch instruction such as a branch if equal instruction. In these embodiments, unconditional control flow instructions may be considered to be of the first type since there are fewer circumstances in which such instructions are likely to alter their behaviour. Consequently, once a prediction has been made, that prediction is unlikely to vary over time. In contrast, in some embodiments, conditional control flow instructions are considered to be of the second type or are considered to be of the first type or second type in dependence on the confidence associated with the prediction.

In some embodiments, the prediction of the first control flow instruction and the prediction of the second control flow instruction are each represented using a counter; and the predefined level is dependent on the counter.

There are a number of ways in which such a counter can be implemented. However, in some embodiments, the counter is a saturated counter; and the predefined level is expressed by the saturated counter having a minimum value or a maximum value. A saturated counter recognises the fact that in a computing system, a counter is limited by the number of bits that can be used to represent its value. In other words, any counter in a computing system has a minimum and a maximum value. With a saturated counter, when the counter reaches its maximum value, it can only be decreased. That is, further actions that would cause the counter to increase have no effect. Similarly, when a saturated counter reaches its minimum value, it cannot be decreased any further and can only be increased. Actions that would cause the counter to be decreased are disregarded. In such embodiments, the predefined level is dependent on the saturated counter. One way of using a saturated counter is by using the sign of the counter to represent the prediction (e.g. taken or not taken) and the magnitude of the counter could represent the level of confidence. Where a counter is unsigned, one bit may be dedicated to indicating the direction of the prediction (taken or not taken) and the remaining bit could be used to represent the confidence. In some embodiments, the counter only uses positive values and a "mid-point" represents the change in prediction. In such embodiments, the confidence is represented by a distance from this mid-point. In each case, the predefined level may be expressed by the saturated counter having a minimum value or a maximum value (e.g. a maximum confidence in one of the two directions).

In some embodiments, the counter comprises a plurality of components; and the predefined level is expressed by a sum of the components being at least a predetermined value. The skilled person will recognise that this is an alternative mechanism to the use of a saturated counter in which the counter comprises a plurality of components each of which represents a different factor that may be used in order to perform the prediction. These components can then be, for instance, added together in order to form a final value and the comparison of this final value with a predetermined value indicates whether the predefined level is met.

In some embodiments, the control flow prediction update circuit is adapted, when the result of the first control flow instruction differs from the prediction of the first control flow instruction and the result of the second control flow instruction differs from the prediction of the second control flow instruction, to update the prediction of an oldest of the first control flow instruction and the second control flow instruction. Once both control flow instructions have been executed, it may be the case that the results indicate that prediction of one or more of these instructions were incorrect. In a situation in which both of the predictions were found to be incorrect, an oldest of the first control flow instruction and the second control flow instruction has its prediction updated. Here, the term "oldest" is intended to refer to which of the two instructions were encountered first. When a miss-prediction occurs, a pipeline flush may often occur. This is because on the basis of the prediction, speculative execution may have occurred in which instructions in the predicted direction may have been fetched, decoded and potentially even executed before the actual result of the branch instruction was determined. Consequently, such execution must be "rewound", by the means of a pipeline flush. It will be appreciated that the more recently the instruction was executed, the less the effect of the pipeline flush. Consequently, where both predictions are found to be incorrect, updating the prediction of the oldest of these instructions is likely to have a less detrimental effect in the future by increasing the chances with which the prediction will be accurately made next time around.

In some embodiments, the control flow prediction update circuit is adapted, when the result of the first control flow instruction differs from the prediction of the first control flow instruction and the result of the second control flow instruction corresponds with the prediction of the second control flow instruction, to update the prediction of the first control flow instruction. When it is determined that only one of the two predictions is found to be incorrect, the control flow prediction circuit updates that miss-prediction so that in the future the prediction will occur correctly.

In some embodiments, the control flow prediction update circuit is adapted, when the result of the first control flow instruction corresponds with the prediction of the first control flow instruction and the result of the second control flow instruction differs from the prediction of the second control flow instruction, to update the prediction of the second control flow instruction. Again, when it is determined that one of the two instructions is miss-predicted, the prediction associated with that instruction is updated in order to limit the probability with which a miss-prediction will occur in the future.

In some embodiments, the control flow prediction update circuit is adapted, when the result of the first control flow instruction corresponds with the prediction of the first control flow instruction and the result of the second control flow instruction corresponds with the prediction of the second control flow instruction, to seek to update the prediction of the second control flow instruction. Since the first control flow instruction is an instruction whose prediction has a high confidence, there is no update to be made in the situation where the result corresponds with the prediction. In contrast, the first control flow instruction may be one whose prediction is either high confidence or low confidence. Consequently, the prediction might be updatable (e.g. if the prediction had a low confidence). Therefore, where both the first control flow instruction and the second control flow instruction have result that correspond with their predictions, the control flow prediction update circuit will seek to update the prediction of the second control flow instruction (e.g. the prediction will be updated if possible).

In some embodiments there is provided a system comprising an execution pipeline divided into a plurality of stages, the execution pipeline comprising the data processing apparatus according to the above-mentioned aspect. A sub-set of the plurality of instructions are grouped together into a block; a packet corresponding to the block is passed between at least some of the plurality of stages; and the packet comprises a single bit to indicate whether the sub-set of the plurality of instructions are to be executed by the high confidence control flow execution circuit. In such embodiments, the instructions are grouped together and instructions are categorised into having high confidence predictions or low confidence predictions on a group-by-group basis.

For instance, in some embodiments, when at least one of the subset of the plurality of instructions is to be executed by one of the control flow execution circuits other than the high confidence control flow execution circuit, the single bit is set to indicate that the subset of the plurality of instructions are to be executed by one of the control flow execution circuits other than the high confidence control flow execution circuit. In this way, one of the instructions being considered to be low confidence, all of the instructions in that group are also considered to be low confidence. The high confidence control flow execution circuit is therefore reserved for instructions or groups of instructions where no part of that group is considered to be low confidence. In this way, the instructions are organised to be executed in such a way that there is a low probability of both instructions requiring update to their predictions at a same time. The need for dual update ports at the prediction circuitry can therefore be reduced as compared to a situation where any instructions are executed simultaneously.

Particular embodiments will now be described with reference to the figures.

Figure 1:
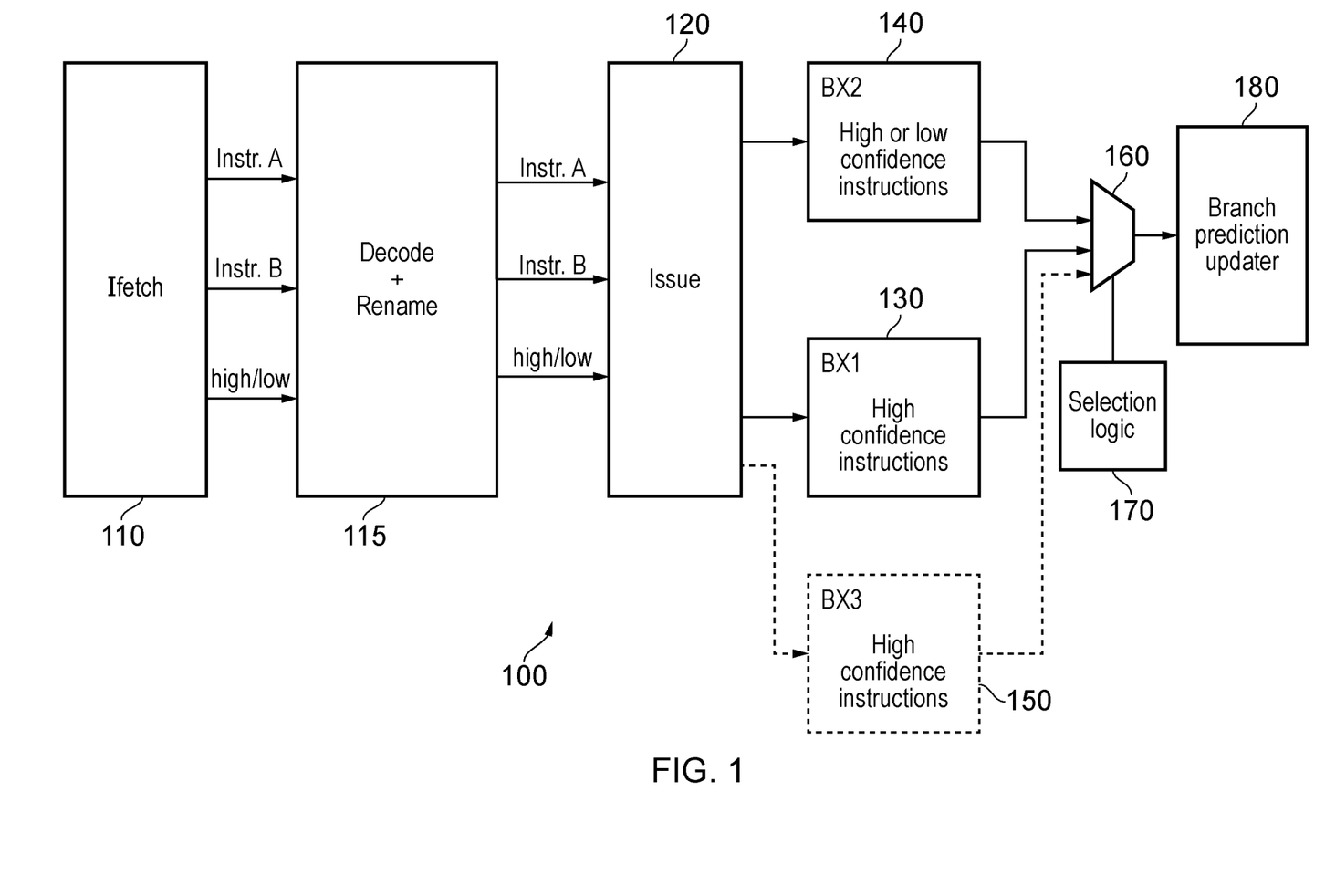
FIG. 1 schematically illustrates an apparatus in accordance with some embodiments.

FIG. 1 schematically illustrates a system 100 in accordance with some embodiments. The system includes instruction fetch circuitry 110 that receives instruction from, for example, an instruction cache. These instructions (labelled A and B) together with an indicator of whether their prediction is high or low confidence is received by Decoder and renamer 115, which perform decoding of the instruction into one or more control signals as well as register renaming in order to support (for instance) out of order execution. The instructions and high/low confidence indicator are then passed to an issue unit 120, which waits until the corresponding register values become ready and then issues the instructions to the corresponding execution unit. The execution units include a first branch execution unit 130 and a second branch execution unit 140. The first branch execution unit 130 is such that it is only permitted to execute high confidence instructions. Meanwhile, the second branch execution circuitry 140 is permitted to execute instructions whose branch prediction is of high or low confidence. A value indicating whether the prediction was correct or not is passed to a multiplexer 160, which output one of these two results to branch prediction updater 180. The selection signal for the multiplexer is provided by a selection logic 170 an example of which is illustrated in more detail with respect to FIG. 4.

As previously described, the inventor has discovered that a majority of branch instructions that are encountered have a high confidence. Consequently, it may be expected that both the first branch execution unit 130 and the second branch execution unit 140 can be used simultaneously. Indeed, in any pair of instructions that are passed to these execution units 130, 140, provided at most one of the instructions is of low confidence, both units can operate substantially in parallel (e.g. in a same processor cycle). Only where two instructions in a pair are of low confidence are the unit unable to operate in parallel and in such a case, a rearrangement of the instructions may make it possible for the two execution units 130, 140 to continue to operate in parallel. FIG. 1 also illustrates how a third branch execution unit 150 can be provided. In this case, the third branch execution unit 130 is also limited to executing instructions whose prediction is of high confidence. Again, a result indicating whether the prediction was correctly met or not is passed to the multiplexer 160 whose selection signal causes one output from each of the branch execution units 130, 140, 150 to the output to the branch prediction updater 180. The branch prediction updater 180 is responsible for updating the branch prediction based on the data that is passed to it. Accordingly, in the future, branch prediction may occur differently.

As will be appreciated in the majority of cases, a pair of branch instructions can be executed simultaneously without the need to provide a pair of update ports at the branch prediction updater 180. This is achieved by only permitting one of the branch execution units 130, 140, 150 to execute branch instructions whose confidence is of a low value so that the probability with which multiple instructions predictions must be updated simultaneously is kept low.

Figure 2A:
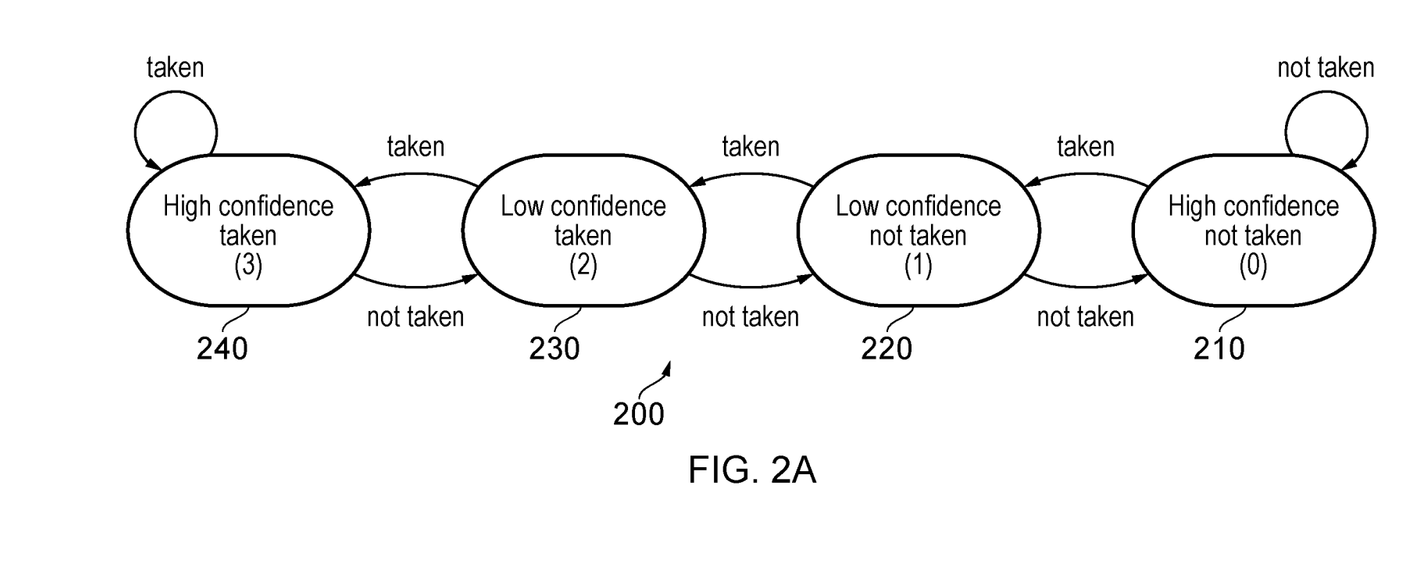
FIG. 2A illustrates the behaviour of a saturated counter for branch prediction.

FIG. 2A illustrates the use of a saturated counter that can be used to represent a prediction comprising both a confidence value and a direction. In this example, the saturated counter comprises four different states numbered 0 to 3. The counter moves between the four states 210, 220, 230, 240 as a result of the branch associated with the counter being taken or not taken. For instance, the counter may begin at a state number one 220, which represents a prediction of not taken with low confidence. If the branch is subsequently not taken then the counter moves to a first state zero 210 in which the counter again predicts not taken but this time with high confidence. This state represents a minimum value of the counter. If the branch continues to not be taken, no further change in this state will occur. Accordingly, the confidence is at its highest value. If, however, the branch is later taken, then the counter will move back to the second state in which the confidence is lowered but the prediction remains as not taken. At that time, if the branch is taken again, then the counter will enter the third state in which the prediction flips to being taken. In this state, 230 although the prediction has changed, the confidence remains at a low value. From here, if the branch is not taken, then the counter returns to the second state 220. Alternatively, if the branch is next taken, then the counter enters a high confidence state in which the prediction is that the branch will be taken. This represents the second state in which the confidence is at a maximum value.

If the branch continues to be taken, then no further state change will occur. However, at any point, if the branch is subsequently not taken, then the branch will return to the third state 230 where the prediction will remain as taken but the confidence will be lowered. Although the four states 210, 220, 230, 240 have been represented by the numbers zero to three, it will also be appreciated that the states could be represented by the values −2, −1, 1 and 2. In such an example, the sign (positive or negative) indicates the prediction (taken or not taken respectively). Meanwhile, the magnitude (1 or 2) represents the confidence (low or high respectively).

Figure 2B:
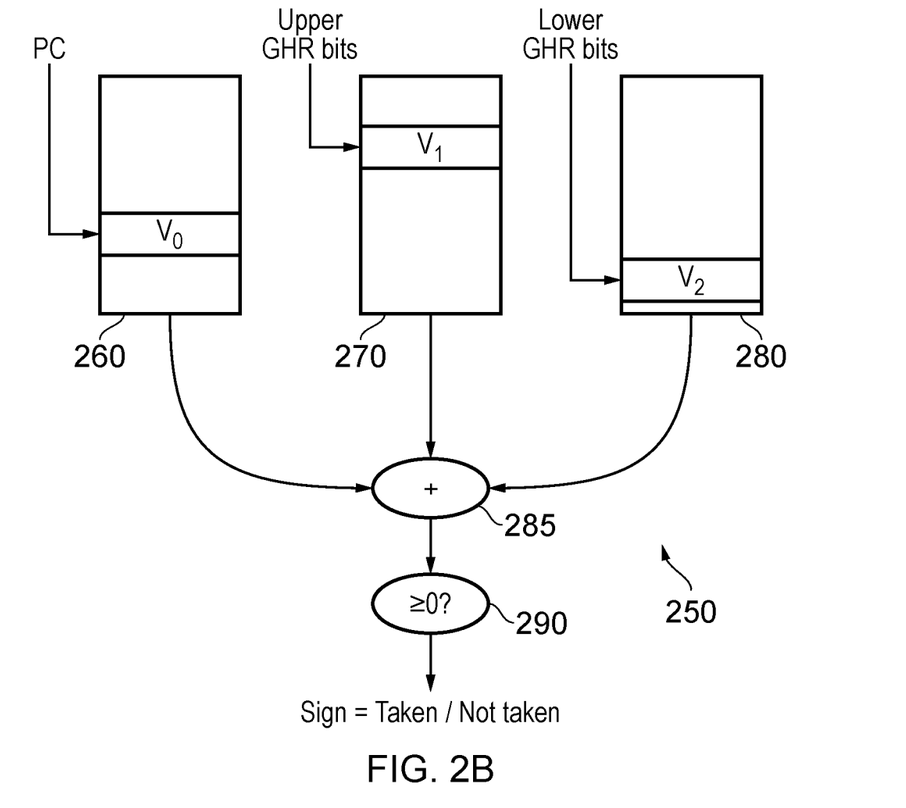
FIG. 2B illustrates a component based counter for branch prediction.

FIG. 2B represents a different example for determining the prediction. In this example, a number of different factors are used in order to index into tables, which in turn provide components that are added together to provide the final prediction. In this example, a value of the program counter is used to index into a first table 260 to obtain a first value $V_0$. A second value comprising the upper bits of a Global History Register (GHR) is used to index into a second table 270 to provide a second value $V_1$. A third value comprising the lower bit of the GHR is used to index into a third table 280 to provide a third value $V_2$. The three values $V_0$, $V_1$, $V_2$ are added together by an adder 285 and compared to zero by a comparison unit 290. The comparison to zero by the comparison unit 290 is used to indicate whether the prediction is taken or not taken. That is, the sign of the summation indicates the direction of the branch. In such embodiments, a high confidence control flow instruction (e.g. branch instruction) is considered to be one where the magnitude of the score provided by the adder 285 is greater than some threshold value.

It will be appreciated by the skilled person that there are a number of other alternatives to these two methods of representing branch predictions. The exact method used in order to determine the branch prediction is irrelevant to the present technique. The present technique is concerned with whether such a prediction is considered to be of high confidence or low confidence. Typically, this will occur by the comparison of a score associated with the prediction being compared to a threshold. The score falling on one side of the threshold will indicate that the prediction is of high confidence while the score falling the other side of the threshold will indicate a low confidence. However, in some embodiments, there may be multiple thresholds or thresholds may not be used at all.

Figure 3:
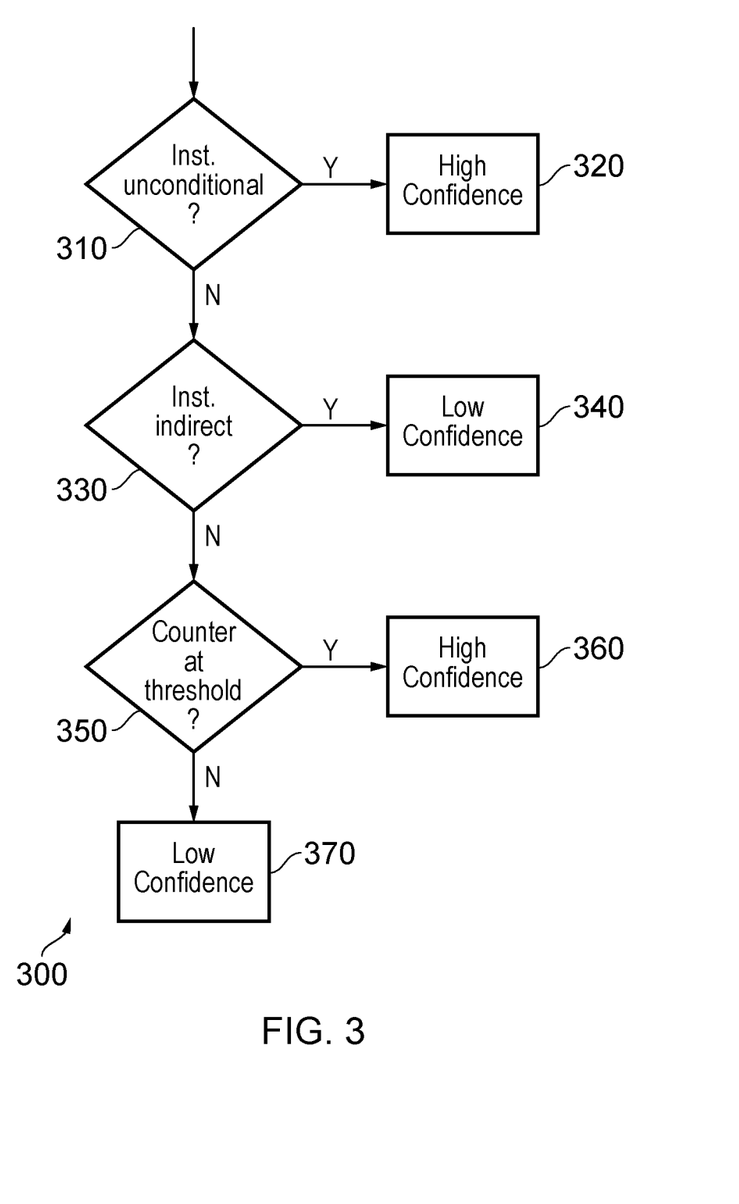
FIG. 3 shows a flowchart that illustrates the process of determining whether a prediction of a branch instruction is low confidence or high confidence in accordance with some embodiments.

FIG. 3 shows a flow chart 300 that illustrates a number of different techniques for determining whether a branch instruction prediction is considered to be high confidence or low confidence. At a step 310, it is determined whether the instruction is considered to be an unconditional branch instruction or not. An unconditional branch instruction is one where the branch is not dependent on the outcome of a test. If so, then the instruction's prediction is considered to be high confidence at step 320. If not, then at step 330 it is determined whether the instruction is considered to be an indirect branch instruction. An indirect branch instruction is one where the target of the branch is provided in a register rather than as part of the instruction itself. If so, then at step 340, the instructions prediction is considered to be of low confidence. Otherwise, at step 350 it is determined whether the counter associated with the prediction is at the threshold value. If so, then at step 360 the instruction's prediction is considered to be high confidence. Otherwise, at step 370, the instruction's prediction is considered to be of low confidence.

In some embodiments, an unconditional branch instruction is considered to be a high confidence prediction instruction regardless of the value of any counter associated with the prediction. This is because such instructions may be considered to be more reliable or unlikely to change outcome as conditional instructions. Similarly, in some embodiments, indirect branch instructions are automatically considered to have low confidence predictions. This is because such instructions may be considered to be more prone to variability and thus more difficult to predict than direct branch instructions. Note also that in this particular embodiment, the counter being at or above the threshold means that the prediction is of high confidence. In other embodiments, this will be reversed and the counter being below a threshold value may indicate a high confidence. Similarly, in some embodiments, it may be the magnitude of the counter that is considered. Also, in some embodiments, there may be multiple thresholds where the counter being at or above one threshold or at or below another threshold may indicate that the counter is high or low confidence appropriately. As previously discussed, the exact technique that is used in order to determine, based on a counter value, whether a prediction is of high confidence or low confidence is immaterial to the present technique.

Figure 4:
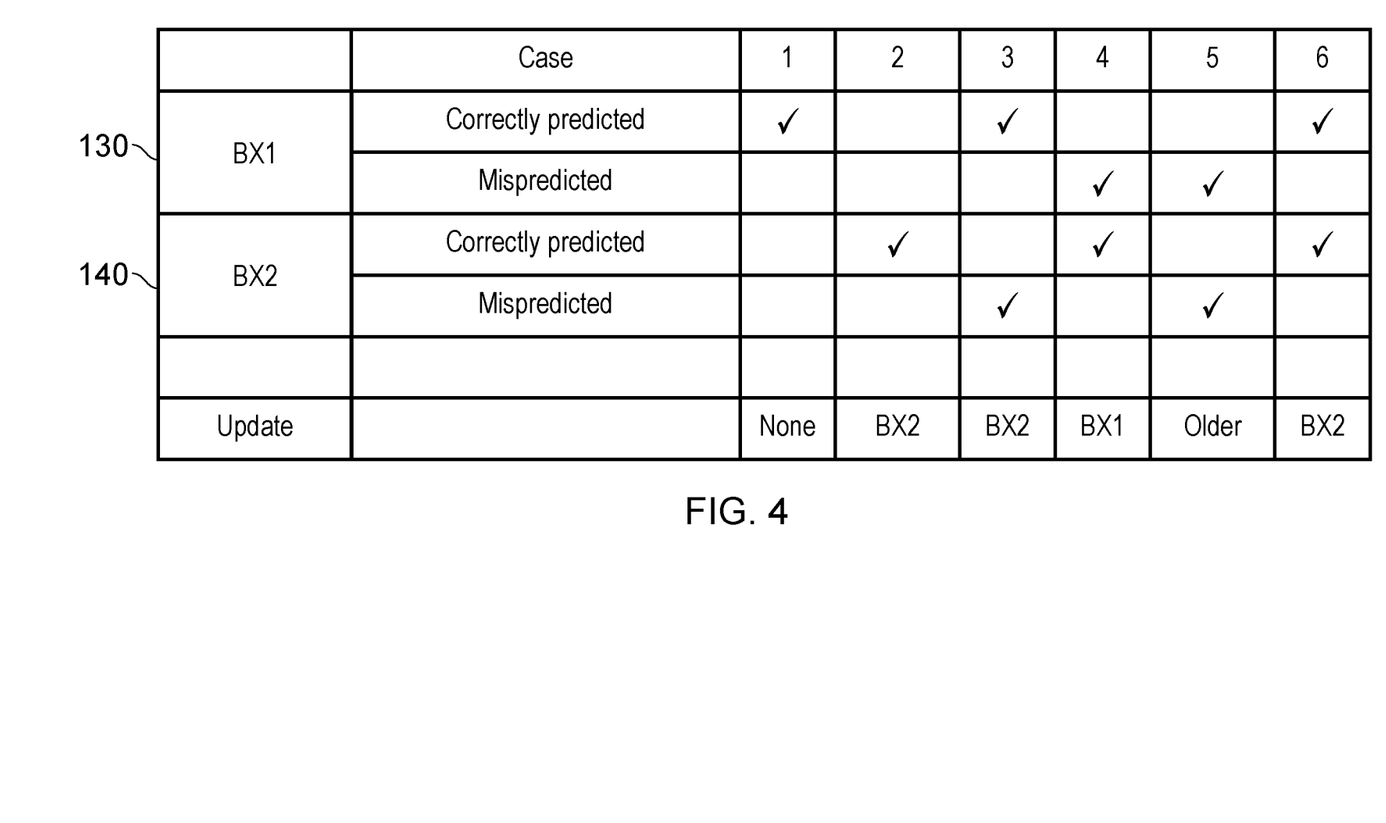
FIG. 4 illustrates how selection of which prediction to update is made in accordance with some embodiments.

FIG. 4 illustrates an example of the selection logic 170 illustrated in FIG. 1. Six different cases or scenarios are provided. Each scenario considers whether the instruction in the first execution unit 130 was predicted correctly or not, whether the instruction in the second execution unit 140 was predicted correctly or not, or whether the execution unit went unused.

In a first case, BX1 130 is used and the prediction was correct whereas BX2 140 is unused. In this case, since BX1 130 is the only unit to be used, the update could only occur in respect of BX1. However, since the prediction was correct and since the prediction was already made with high confidence, there is no update to perform.

In a second case, BX1 130 remains unused, while BX2 140 is used and the prediction was correct. In this case, the prediction could possibly be updated since it could relate to a low confidence prediction. In this case, therefore, the selection logic 170 will seek to cause the second branch execution unit 140 to be updated. This may or may not result in an update depending on the confidence of the prediction.

In a third case, both BX1 130 and BX2 140 are used and a miss-prediction occurs in respect of BX2 140 but not in BX1 130. In this case, the priority is to correct the miss-prediction to inhibit it from occurring in the future, and consequently the update is made with respect to BX2 140.

In a fourth case, the reverse situation occurs in which a miss-prediction occurs in respect of BX1 130 and a correct prediction occurs in respect of BX2 140. Again, the priority is to correct the miss-prediction, and thus the update occurs with respect to BX1 130.

In a fifth case, a miss-prediction occurs with respect to both BX1 130 and BX2 140. Only one update is permitted. Accordingly, the priority is to update prediction associated with the older of the instructions executed by BX1 130 and BX2 140. This is to reduce the probability of a miss-prediction occurring in respect of the older instruction in the future. By improving the chance with which the older instruction will be predicted correctly, the effect of any pipeline flush that occurs as a consequence of a miss-prediction can be reduced.

Finally, in a sixth case, correct prediction occurs in respect of both BX1 130 and BX2 140. As with the second case, there is no update to be made in respect of BX1 130, since only a high confidence instruction can have been executed by BX1 130 and such an instruction was predicted correctly. Consequently, the only update to the prediction that could occur is at BX2 140 where a low confidence instruction could have been executed. Consequently, the update process will seek to cause an update at the prediction associated with the instruction executed by BX2 140, which may or may not be necessary depending on the previous confidence value of the instruction that was executed.

Figure 5:
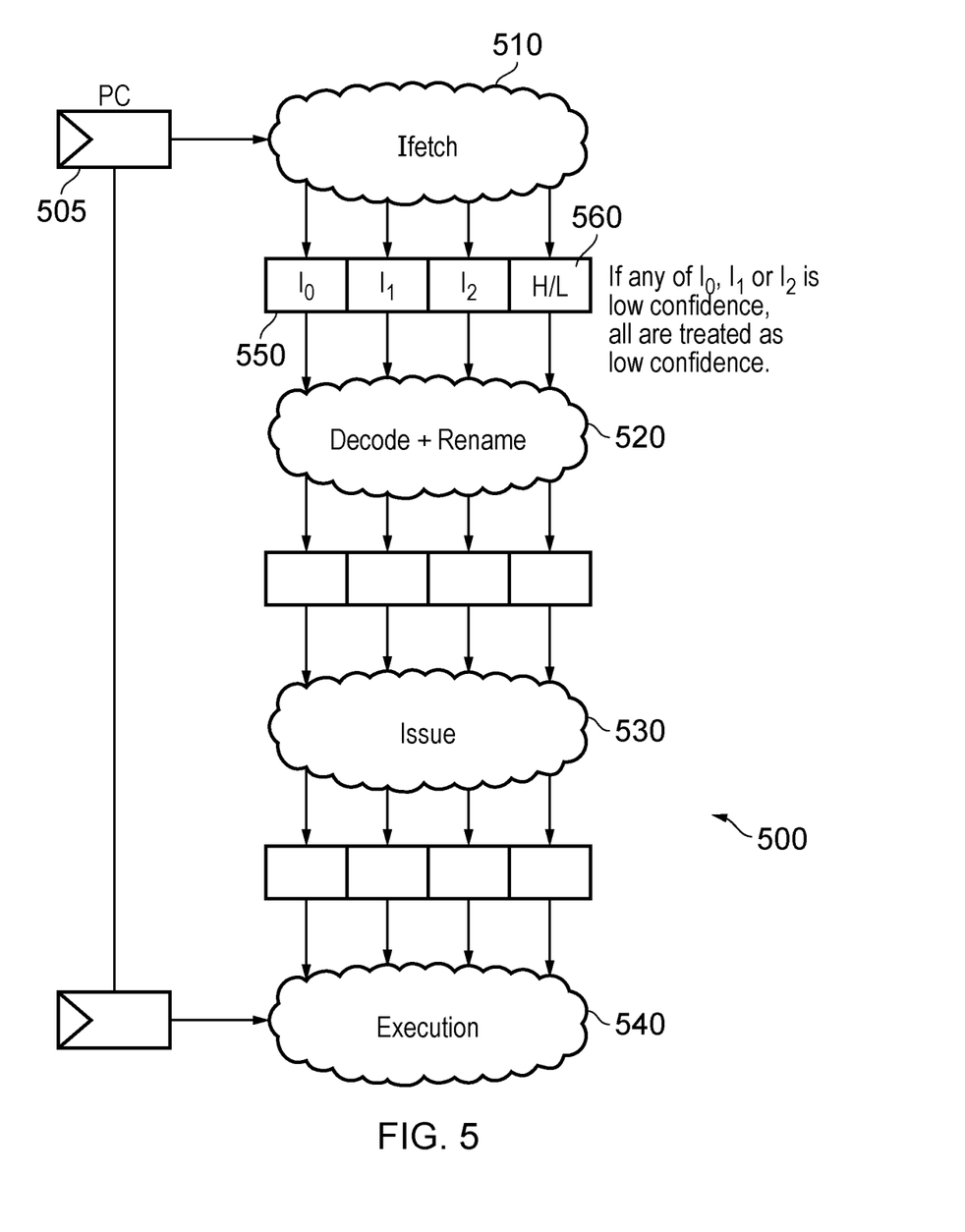
FIG. 5 shows the behaviour of a pipeline in which instructions are grouped together for branch prediction.

FIG. 5 illustrates a pipeline 500 that comprises a number of stages. In this example, the stages include an instruction fetch stage 510, a decode and rename stage 520, an issue stage 530, and an execution stage 540. In the instruction stage 110, one or more instructions are fetched from, for instance, an instruction cache based on the value of a program counter 505. The instructions ($I_0$, $I_1$, $I_2$) are loaded into a packet 550 together with a bit 560 indicating whether those instructions should be treated as high or low confidence. A determination such as the one shown with reference to FIG. 3 may be made individually for each of these instructions. The bit 560 representing the determination for the group is such that if any one of the instructions is determined to be low confidence, then the entire group is considered to be low confidence. This packet 550 is passed between the various stages 510, 520, 530, 540. Having been fetched by an instruction fetcher 110 at the fetch stage, the instructions are decoded into one or more control signals by the decode and rename stage 520. Register renaming is a process in which registers can be mapped or redirected such that it is possible for instructions to be executed out of order whilst still producing the same result as if the instruction had been kept in strict order. This technique makes it possible to avoid a situation in which an instruction must be stored while the result of another instruction is determined. Issuing then occurs during the issue stage 530. Finally, the instructions are executed at a step 540.

Parts of the apparatus 100 illustrated with respect to FIG. 1 can be corresponded to different parts of the pipeline 500. For instance, the instruction fetch circuitry 110 shown in FIG. 1 will operate during the instruction fetch stage 510 of the pipeline 500. Similarly, the decode and rename circuitry 115 will operate during the decode and rename stage 520, the issue circuitry 120 will operate during the issue stage 530, and branch execution units 130, 140, 150 operate during the execution stage 540 of the pipeline 500. Using pipelining in this manner makes it possible for instructions to be interleaved such that one instruction can be executed while another is renamed while another is decoded while another is fetched, etc.

Figure 6:
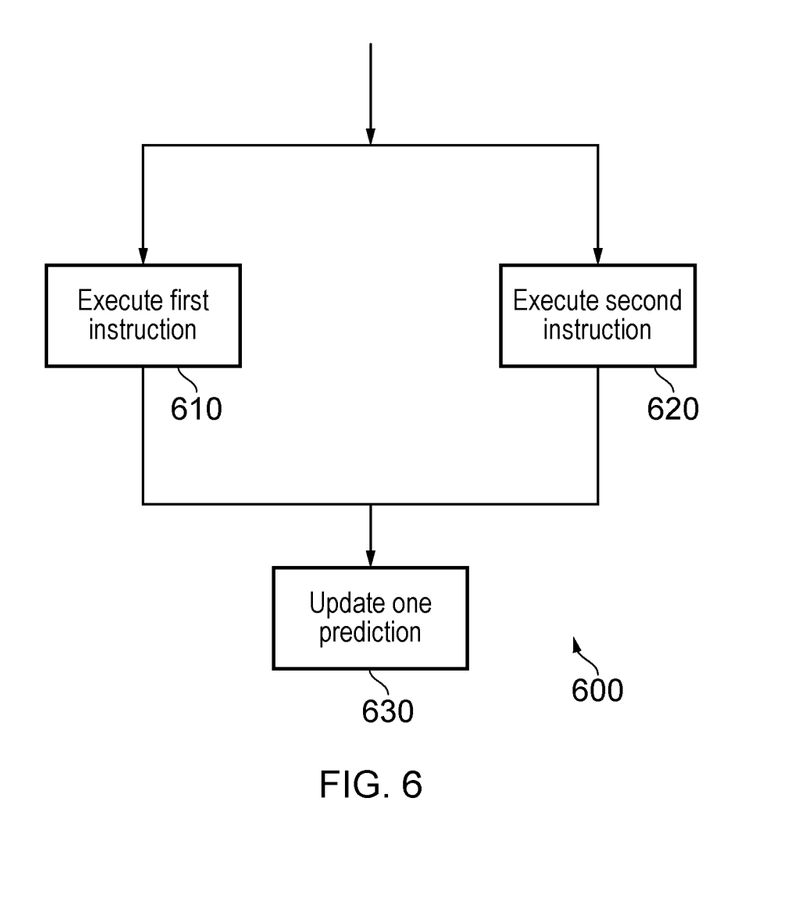
FIG. 6 shows a flowchart that illustrates the behaviour of a method in accordance with some embodiments.

FIG. 6 illustrates a flow chart 600 that shows a method in accordance with some embodiments. Steps 610 and 620 occur substantially in parallel. For instance, each of these steps could occur in a same processor cycle. In step 610, a first control flow instruction (e.g. a branch instruction) having a first type is executed. In a step 620, a second control flow instruction (e.g. branch instruction) having a second type is executed. Finally, at a step 630, a prediction of at most one of the first control flow instruction or the second control flow instruction is updated.

In this way, it will be appreciated that even though only a single update port is provided, it is possible to execute a plurality of control flow instructions (such as branch or return instructions) at the same time. Similarly, even though only one prediction can be updated, it has been discovered that much of the time, this is all that is necessary. Furthermore, any detrimental effect as a consequence of only performing one update when two updates are necessary, may not only be rare but may be limited. Consequently, it is possible to execute both instructions simultaneously while providing only a single update port at the control flow prediction update circuit.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. A data processing apparatus comprising:
a plurality of control flow execution circuits to simultaneously execute a first control flow instruction having a first type and a second control flow instruction having a second type from a plurality of instructions; and
a control flow prediction update circuit to update at most one of:
a prediction of the first control flow instruction based on a result of the first control flow instruction, and
a prediction of the second control flow instruction based on a result of the second control flow instruction.

2. The data processing apparatus according to claim 1, wherein
the plurality of control flow execution circuits comprises a high confidence control flow execution circuit to execute the first control flow instruction; and
the first type includes control flow instructions whose prediction has a confidence above a predefined level.

3. The data processing apparatus according to claim 1, wherein
the plurality of control flow execution circuits are adapted to simultaneously execute a third control flow instruction having the first type from the plurality of instructions; and
the plurality of control flow execution circuits comprises a further high confidence control flow execution circuit to execute the third control flow instruction.

4. The data processing apparatus according to claim 2, wherein
the first type includes direct control flow instructions.

5. The data processing apparatus according to claim 2, wherein
the first type includes unconditional control flow instructions.

6. The data processing apparatus according to claim 2, wherein
the prediction of the first control flow instruction and the prediction of the second control flow instruction are each represented using a counter; and
the predefined level is dependent on the counter.

7. The data processing apparatus according to claim 6, wherein
the counter is a saturated counter; and
the predefined level is expressed by the saturated counter having a minimum value or a maximum value.

8. The data processing apparatus according to claim 6, wherein
the counter comprises a plurality of components; and
the predefined level is expressed by a sum of the components being at least a predetermined value.

9. The data processing apparatus according to claim 2, wherein
the control flow prediction update circuit is adapted, when the result of the first control flow instruction differs from the prediction of the first control flow instruction and the result of the second control flow instruction differs from the prediction of the second control flow instruction, to update the prediction of an oldest of the first control flow instruction and the second control flow instruction.

10. The data processing apparatus according to claim 2, wherein
the control flow prediction update circuit is adapted, when the result of the first control flow instruction differs from the prediction of the first control flow instruction and the result of the second control flow instruction corresponds with the prediction of the second control flow instruction, to update the prediction of the first control flow instruction.

11. The data processing apparatus according to claim 2, wherein
the control flow prediction update circuit is adapted, when the result of the first control flow instruction corresponds with the prediction of the first control flow instruction and the result of the second control flow instruction differs from the prediction of the second control flow instruction, to update the prediction of the second instruction.

12. The data processing apparatus according to claim 2, wherein
the control flow prediction update circuit is adapted, when the result of the first control flow instruction corresponds with the prediction of the first control flow instruction and the result of the second control flow instruction corresponds with the prediction of the second control flow instruction, to seek to update the prediction of the second control flow instruction.

13. A system comprising:
an execution pipeline divided into a plurality of stages, the execution pipeline comprising the data processing apparatus according to claim 1, wherein
a subset of the plurality of instructions are grouped together into a block;
a packet corresponding to the block is passed between at least some of the plurality of stages; and
the packet comprises a single bit to indicate whether the subset of the plurality of instructions are to be executed by the high confidence control flow execution circuit.

14. A system according to claim 13, wherein
when at least one of the subset of the plurality of instructions is to be executed by one of the control flow execution circuits other than the high confidence control flow execution circuit, the single bit is set to indicate that the subset of the plurality of instructions are to be executed by one of the control flow execution circuits other than the high confidence control flow execution circuit.

15. A method comprising:
simultaneously executing a first control flow instruction having a first type and a second control flow instruction having a second type from a plurality of instructions; and
updating at most one of:
a prediction of the first control flow instruction based on a result of the first control flow instruction, and
a prediction of the second control flow instruction based on a result of the second control flow instruction.

16. A data processing apparatus comprising:
  means for simultaneously executing a first control flow instruction having a first type and a second control flow instruction having a second type from a plurality of instructions; and
  means for updating at most one of:
    a prediction of the first control flow instruction based on a result of the first control flow instruction, and
    a prediction of the second control flow instruction based on a result of the second control flow instruction.

\* \* \* \* \*